July 5, 1927.  
H. C. SNYDER  
APPARATUS FOR AND METHOD OF MAKING ROD PACKING  
Filed March 10, 1924
1,634,520
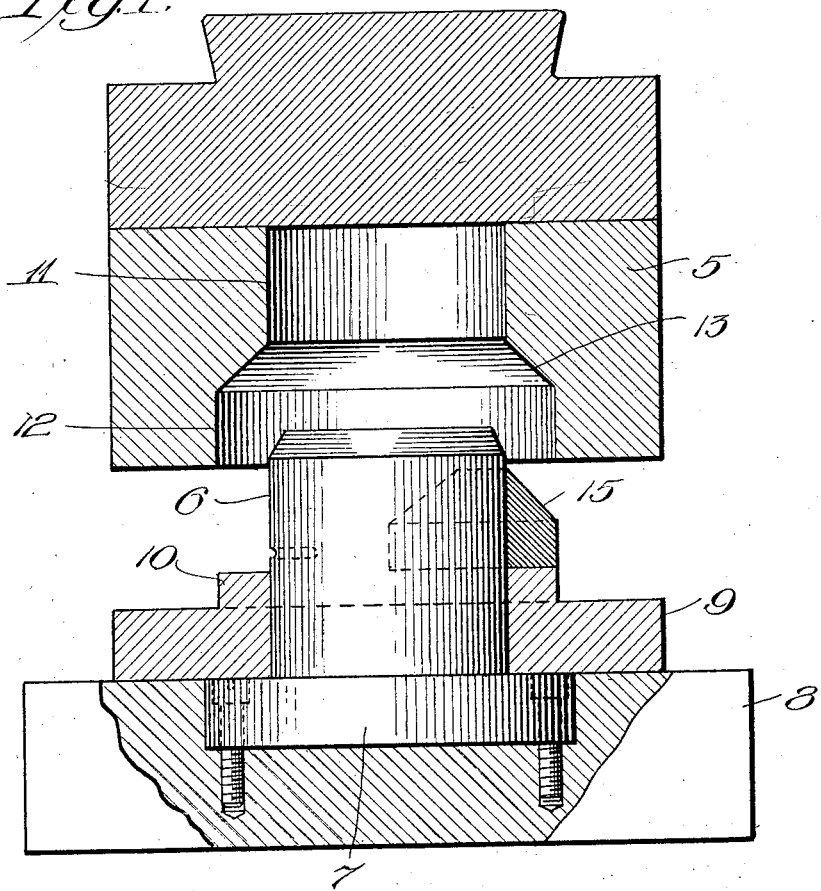
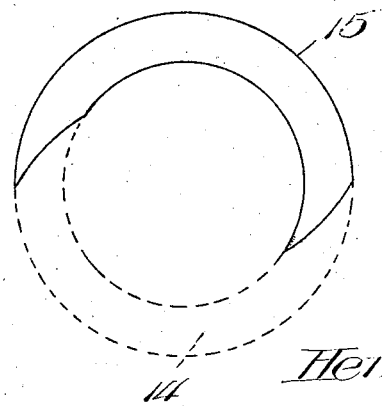
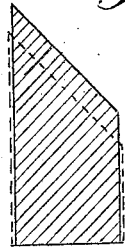
Inventor;  
Herbert C. Snyder.  
By Rector, Hibben, Davis, and Macauley,  
Attys Patented July 5, 1927.

1,634,520

UNITED STATES PATENT OFFICE.

HERBERT C. SNYDER, OF CHICAGO, ILLINOIS, ASSIGNOR TO STEWART MANUFACTURING CORPORATION, OF CHICAGO, ILLINOIS, A CORPORATION OF DELAWARE.

APPARATUS FOR AND METHOD OF MAKING ROD PACKING.

Application filed March 10, 1924. Serial No. 698,150.

My invention relates to apparatus for and method of making packing for piston and valve rods and the like, and the principal objects thereof are to provide an improved apparatus for, and produce a novel and efficient method of forming such rod packing.

In the usual practice in the manufacture and fitting of rod packing, the ring is made in two or more sections or segments for the purpose of obtaining a continuous close fit around the rod. The segments, forming the ring, are usually cast in sand molds. The complemental faces of the joints are then ground so as to produce as perfect a fit as possible. The joints of these segments are formed to a feather edge and the joints must be tight and perfect, as otherwise the ring is useless. In casting the segments in a sand mold, the segments usually are subject to blow or sand holes, and it has been the practice to fill these holes with solder or other suitable soft material. But in use, this filling material becomes soft and runs out of the holes with the result, among others, that there is some leakage or escape of the steam as well as breakage of the ring. It has been found that the complemental faces of the joints cannot be perfectly ground so that they fit together as accurately as required and so that each joint is the same as the other joint or joints of the ring and therefore it has been necessary for the manufacturer of packing to assemble the segments of the rings together, then soften the material in any suitable manner, and finally place a suitable clamp about the assembled segments to compress them into position and pound the joints with a heavy hammer until the complemental faces come accurately and intimately into contact throughout. The different joints are marked 1—1, 2—2, and so on, according to the number of segments in the ring, so formed, so that the respective complementary joint faces may be brought together when the ring is assembled for use on the rod. In the event that the feather edge of one of the segments becomes broken in the slightest degree, either in shipping the packing or in handling it before it reaches its destination, or in the fitting of the packing upon the rod, the entire ring becomes absolutely useless, as steam blows through between the rod and the inside of the ring where the feather edge has been broken. Railroad records have shown that even with a two-piece packing there is a loss or wastage of over 25 per cent on account of this breakage. If the feather edge of one of these segments is broken, a segment of another ring or a spare segment can not be substituted for it because its ground joint surfaces would not exactly coincide with the corresponding or complemental surfaces of the remaining segment or segments of the ring. This is the case because the segments are not all exactly the same, it having been found in actual practice impossible to grind the joints so that the sections are interchangeable. Hence with rings, as previously made, if the feather edge of one of the segments is broken or the segment is otherwise injured, the entire ring is scrapped, although the remaining segment or segments may be uninjured. It is also obvious that were segments of different rings accidentally or otherwise mixed up or substituted while being prepared or bored out by a workman for application to rods, all of the segments of all of the rings, which do not have their original component segments assembled in proper relation, would have to be scrapped because if the original component segments are not used in the proper relation, the joints are not tight and close, as is required, and the ring is useless.

The principal objects of my invention are to provide an improved die for and method of compressing piston packing ring segments to accurate finished size and shape so that the segments are interchangeable and hence may be assembled and used together in any order, thus overcoming the above objections to packing rings as previously made. Other objects of my invention are to enhance the quality and efficiency of packing rings and cheapen their manufacture.

In the drawings, Fig. 1 is a vertical sectional view through my improved apparatus for forming the finished segments; Fig. 2 is a top plan view showing in full lines a master ring segment and in dotted lines a finished segment; and Fig. 3 is a cross section through an unfinished segment and illustrates in dotted lines the cross sectional area of the segment after it has been finished by the use of my invention.

In the present instance, by preference, I have shown an apparatus for forming segments, which are to comprise two-piece rings, but the invention is applicable for forming segments of rings made up of any other desired number of segments.

Referring to Fig. 1 of the drawings, the compression die comprises an outer die member 5 and an inner die member 6, the latter being in the form of a cylindrical member integral or otherwise secured to a cylindrical base 7 of larger diameter. The base 7 is mounted in a recess in the table or support 8, as shown, and mounted on the table 8 and around the member 6 is a plate or disc 9 having an angular flange 10 fitting close against the member 6 and having the same width as the finished segment. The member 5 has a concavity the upper reduced cylindrical portion 11 of which is of the same diameter as the member 6 while its lower cylindrical part 12 is of substantially the same diameter as the outer periphery of the angular flange 10, the cylindrical portions 11 and 12 being connected by the conical or inclined portion 13 of the concavity.

The unfinished semi-circular segment, when cast or otherwise formed, is considerably higher and somewhat less in width than it is when finished by my method. This is illustrated in Fig. 3, in which the cross sectional areas of the unfinished and finished segments are represented by the sectional shading and dotted lines respectively. For the sake of convenience the dotted lines 14 in Fig. 2 may represent the finished segment and the full lines may represent a master ring segment 15, which is exactly the same size and shape as, and hence a counterpart of, the finished segment. This master segment which may be formed of steel or other hard metal is also shown in cross-section and dotted lines in Fig. 1.

In practicing my invention the master segment is placed on the flange 10 and the unfinished segment is placed on the opposite of the die member 6, so that the master segment and the unfinished segment form substantially a ring, although the meeting faces are not accurately or intimately in contact, it being impossible to cast the segments so that the joints are perfect. The die member 5 is then forced down, by hydraulic or other pressure, until its lower face is in contact with the upper face of the plate 9. During this operation the conical portion 13 of the concavity in the die member 5 engages the inclined top face of the unfinished segment with the result that the metal of this segment is compressed and forced to spread laterally into intimate contact with the outer cylindrical surface of the member 6 and the cylindrical surface 12 of the member 5 until it assumes substantially the cross-sectional area indicated by the dotted lines in Fig. 3. Practically no flash is formed on the finished segments.

The master segment 15 rests freely upon the flange 10 and, while it fits snugly between the die members during the compression operation, yet it is free to move annularly in either direction, as it is not rigidly anchored to the flange 10 or the member 6. This is a very important feature of my invention as it permits the formation of more uniform and homogeneous segments. When the unfinished segment is formed it is not accurate, as above mentioned, and slightly more metal may be contained in one portion than in another portion. If the master segment were anchored and the excess metal is, for example, adjacent the right hand end of the unfinished segment and that end is firmly in contact with the adjacent end of the master segment, the equal annular distribution of metal, when compressed between the dies, would take place in one direction and substantially throughout the entire length of the segment, the left hand end of the unfinished segment being forced to spread annularly into intimate contact with the adjacent end of the master segment. By having the master segment free to slide in either direction around the member 6 during the compressing operation, it can shift either way to readily accommodate the annular distribution of the metal. For example, again assume that there is an excess of metal adjacent the right hand end of the unfinished segment, the metal is free to flow or be distributed towards the right in the direction of such end with the result that the master segment is moved to the right until equal pressure is exerted on its opposite ends by the segment being formed.

It will be obvious that by the use of my invention, the die compacts and densifies the metal of the segments being formed and gives them their accurate final shape. As each segment is pressed exactly to size in the die and the joint surfaces are accurately formed the segments are all exactly alike and hence interchangeable without the necessity of performing other operations on them as has been previously the case. The metal of ring is also more homogeneous, its quality is enhanced and its durability increased. Furthermore, the apparatus is so constructed that there is no unequal strains or stresses present in the finished segments and they do not spring or distort from their accurate concentric form when removed from the apparatus.

It is desirable that when the die members are separated, after finishing a segment, that the segment be prevented from adhering to the member 5 because in that case it would be necessary to use tools to extract it from the cavity in the member 5. To this end, I provide a slight recess or groove 18, (which may also be an indented trade mark) in the cylindrical surface of the member 6 so that during the compression of the segment, part of its metal is forced into this groove, thus preventing the finished segment from being lifted with the die member 5.

I claim:

1. In an apparatus of the class described, the combination of compression die members for compressing packing ring segments to accurate finished size and shape and having an annular recess between them to form the segments, and a master segment adjustable annularly in said recess by the flow action of the metal in the segment being formed.

2. In an apparatus of the class described, the combination of compression die members for compressing packing ring segments to accurate finished size and shape and having an annular recess of greater width and lesser height than the unfinished segment, the unfinished segment being finally finished in said recess, and a master segment of hard metal free in said recess adjustable annularly therein by the flow action of the metal in the segment being formed.

3. In an apparatus of the class described, the combination of inner and outer compression die members for successively and separately compressing interchangeably identical packing ring segments to accurate finished size and shape and having between them and around the inner die member an annular recess of greater width and substantially lesser height than the unfinished segment, and a master segment in said recess self adjustable by the pressure of the expanding metal to effect equal annular distribution of such expanding metal.

4. In an apparatus of the class described, the combination of two die members for compressing packing ring segments to accurate finished size and shape and having an annular recess between them, the radius of the inner perimeter of which is less than the radius of the inner perimeter of the unfinished segment and the radius of the outer perimeter of which is greater than the radius of the outer perimeter of the unfinished segment, while the height of the recess is less than the height of the unfinished segment, and a master segment forming a counter part of the finished segment and floatingly mounted in said recess for annular movement by the flowing movement of the metal of the segments being formed during a compression operation.

5. In an apparatus of the class described, the combination of two die members for compressing packing ring segments to accurate finished size and shape and having an annular recess between them to form the segments, the inner die member being provided with a recess to prevent the finished segment from adhering to the concavity of the outer die member, and a master segment in said recess.

HERBERT C. SNYDER.